Figure 1:
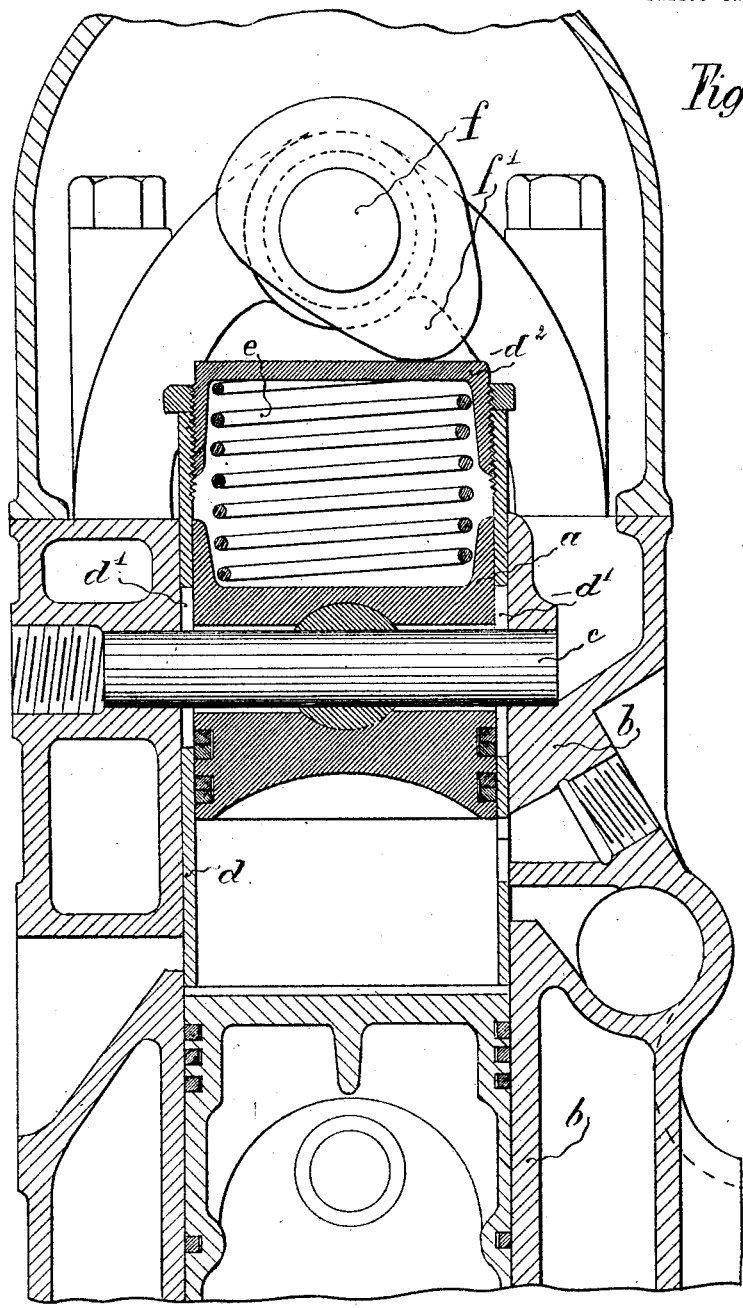

H. V. J. JOUFFRET.
SLEEVE VALVE INTERNAL COMBUSTION ENGINE.
APPLICATION FILED MAY 29, 1919.

1,358,558.

Patented Nov. 9, 1920.
2 SHEETS—SHEET 1.

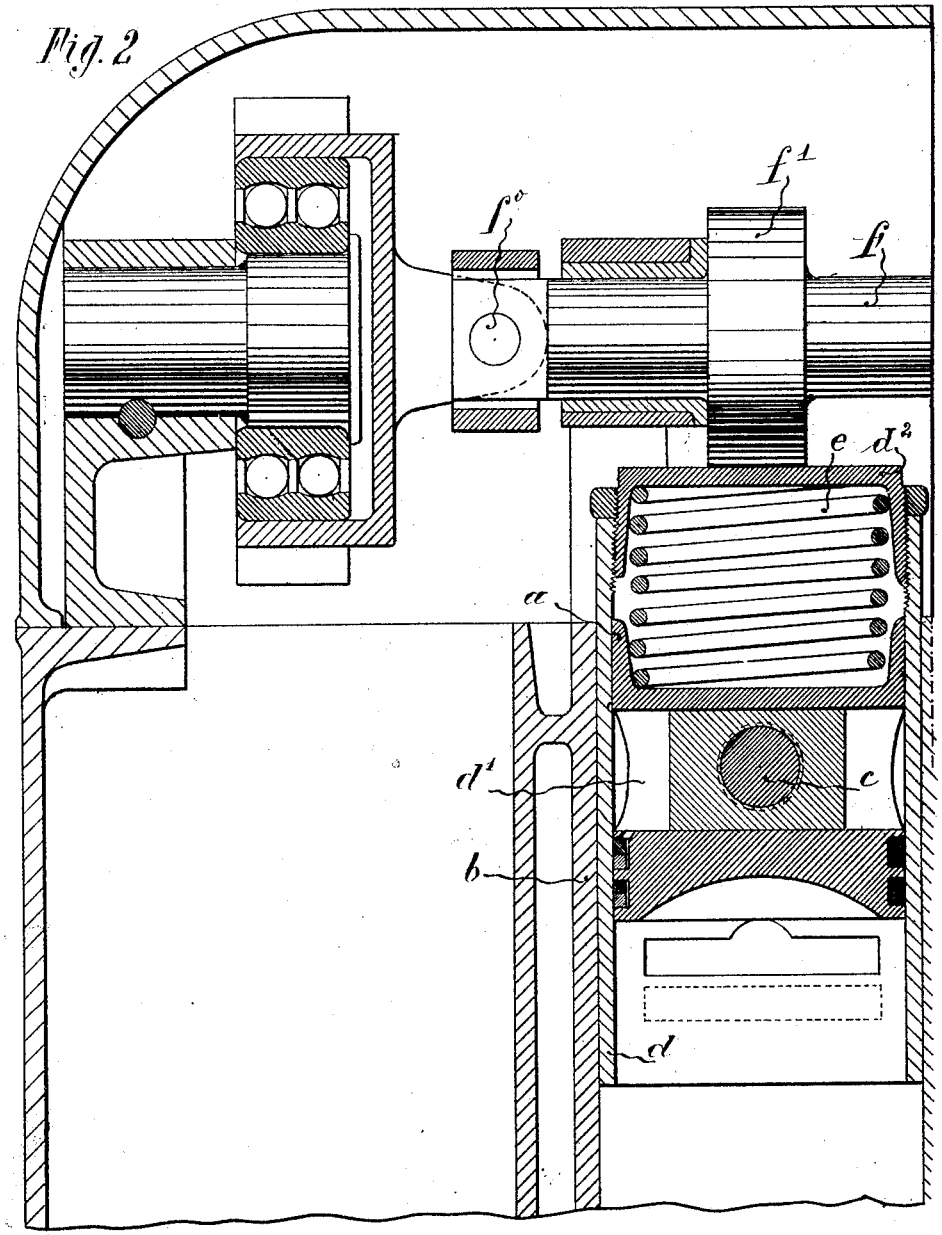

UNITED STATES PATENT OFFICE.

HENRI VICTOR JULES JOUFFRET, OF NEUILLY-SUR-SEINE, FRANCE.

SLEEVE-VALVE INTERNAL-COMBUSTION ENGINE.

1,358,558.      Specification of Letters Patent.      Patented Nov. 9, 1920.

Application filed May 29, 1919. Serial No. 300,722.

*To all whom it may concern:*

Be it known that I, HENRI VICTOR JULES JOUFFRET, engineer, citizen of the French Republic, residing in Neuilly-sur-Seine, Department of Seine, France, have invented certain new and useful Improvements in Sleeve-Valve Internal-Combustion Engines, of which the following is a specification.

This invention relates to sleeve-valve internal combustion engines.

It has for its principal object to enable engines of the class in question to be so constructed that the sleeve can be controlled in a more efficient and simple manner than has hitherto been the case.

The engine is of the type in which each of the cylinder heads is furnished with an internal boss or projection between the outer surface of which and the inner wall of the cylinder, an annular space is provided for the passage of the sleeve, and the invention consists essentially in so mounting and arranging the said boss, that the distributing sleeve can be extended to the outside, in providing the outer extremity of the said sleeve with a base plate upon which a cam carried by the controlling shaft can operate directly, and in providing a spring interposed between the base plate and the boss, which spring tends to keep the base plate in contact with the cam.

In addition to the principal construction just mentioned, the invention includes certain other constructions or arrangements, which will be more fully described hereafter.

It refers more particularly to certain practical embodiments of the constructions or arrangements and includes, as new industrial products, motors of the class in question with the new constructions adapted thereto, as well as special parts suitable for their manufacture.

In order that the said invention may be clearly understood, I will now proceed to describe the same with reference to the accompanying drawing, which however, it is to be clearly understood, is given merely by way of example.

Figures 1 and 2 of the said drawing show in axial section in two planes perpendicular to one another a portion of the cylinder of an engine constructed according to my invention.

According to the method of carrying out the invention more particularly illustrated on the drawing, the internal combustion engine is provided with sleeve valve mechanism of the usual character, but with certain constructional modifications now about to be described.

The boss is formed as a sort of piston $a$, which is so mounted in the cylinder $b$ by means of a transverse axle $c$, that an annular space for the passage of the sleeve $d$ is left between the outside of the piston $a$ and the inner wall of the cylinder $b$.

I provide, in the said sleeve, slots $d^1$ through which passes the axle $c$, and which allow the sleeve to be given a reciprocating movement.

The sleeve extends to the outside of the cylinder and beyond the piston $a$ and at the outer extremity of the sleeve is mounted a base piece $d^2$.

Between the piston $a$ and the base piece $d^2$ is interposed a spring $e$, which tends to push the base piece away from the piston.

Above the base pieces $d^2$ of the sleeves of the various cylinders, I so mount a cam shaft $f$ that a cam $f^1$ thereon corresponds to each sleeve and operates directly upon the corresponding base piece.

With this construction, I obtain an engine in which the valve operation is secured in a very simple manner.

The movement of the sleeve in one direction is produced by the corresponding cam $f^1$, and in the opposite direction by the spring $e$.

The foregoing construction produces an efficient engine, but I prefer to combine one or more of the following arrangements in building an engine.

I may combine in my present engine the construction forming the subject matter of my previous specification of one patent application S. N. 188203, dated 25th August, 1917. In this case I mount the piston $a$ by a pivotal link or joint in connection with the axle $c$, so that the centering is obtained automatically.

Again, I may combine the arrangement forming the subject matter of my application Serial No. 300,721 filed on the same day as the present application namely, May 29, 1919, for "Improvements relating to distributing or valve controlling apparatus operated by a cam shaft." I may provide the cam shaft in the neighborhood of its operating part with a hinged joint $f^0$, and in this way, after dismounting the housings of the bearings, I am able to move the cam shaft and obtain access to the sleeves without interference by the cam shaft.

It is to be understood that the invention is not limited to the particular methods of carrying the same into effect, which have been more fully described, as constructional modifications may be introduced without departing from the principle of my invention.

Having now particularly described and ascertained the nature of my said invention and in what manner the same is to be performed, I declare that what I claim is:—

1. In a sleeve valve internal combustion engine of type including a sleeve and wherein each cylinder head is provided with an inner boss or projection so formed and arranged as to provide between its outer surface and the inner wall of the cylinder, an annular space for the passage of the sleeve, said engine including a controlling shaft and a cam carried by said shaft, a boss so formed and arranged that the sleeve can be extended to the outside and in which the outer end of the sleeve is provided with a base plate adapted to coöperate directly with the cam carried by the controlling shaft, and a spring interposed between the base plate and the boss and adapted to keep the base plate in contact with the cam, substantially as described.

2. An engine such as that claimed in claim 1, in which the boss is formed as a piston and attached to the cylinder by means of a transverse axle thereby providing between said boss and the inner wall of the cylinder an annular space for the passage of the sleeve, the said sleeve being formed with slots through which said axle passes.

3. An engine such as that claimed in claim 1, in which the sleeve extends outside the cylinder and beyond the outer face of the piston, and a base plate at the outer end of said sleeve.

4. In an internal combustion engine of the type comprising a plurality of cylinders, a sleeve in each cylinder, a boss in each cylinder, so formed and arranged as to provide between its outer surface and the inner wall of the cylinder an annular space for the passage of the sleeve, and so arranged that the sleeve projects beyond said boss, a controlling shaft mounted above the ends of the sleeves of the respective cylinders, cams carried by said shaft, a base plate on the outer end of each sleeve, said plates being adapted to coöperate with the cams carried by said controlling shaft, and a spring interposed between each base plate and its respective boss, said springs being adapted to maintain said base plates in contact with their respective cams.

5. In an internal combustion engine of the type comprising a plurality of cylinders, a sleeve in each cylinder, a boss, formed as a piston and mounted by means of a ball and socket joint, within each cylinder, said boss being so formed as to provide between its outer surface and the inner wall of the cylinder an annular space for the passage of the sleeve, a controlling shaft mounted above the ends of the sleeves of the respective cylinders, cams carried by said shaft, a base plate on the outer end of each sleeve, said plates being adapted to coöperate with the cams carried by said controlling shaft, and means interposed between each base plate and its respective boss to maintain the plate in contact with its cam.

6. In an internal combustion engine of the type comprising a plurality of cylinders, a sleeve in each of said cylinders, a boss in each cylinder, said boss being so formed and arranged as to provide between its outer surface and the inner wall of the cylinder an annular space for the passage of its respective sleeve and so arranged that each sleeve projects beyond its respective boss, a base plate on the outer end of each sleeve, a cam shaft mounted above said cylinders, cams carried by shaft, said shaft being provided with a joint adjacent each respective cam whereby the cam shaft may be moved to permit ready access to each respective sleeve.

In testimony whereof I have hereunto set my hand in presence of two subscribing witnesses.

HENRI VICTOR JULES JOUFFRET.

Witnesses:
LUGUI JUTHE,
CHAS. P. PRESSLY.